Dec. 25, 1951  A. MARCHAND  2,579,943
STRUCTURAL FRAME UNIT FOR MOUNTING DECORATIVE STRIPS
Filed Sept. 1, 1950
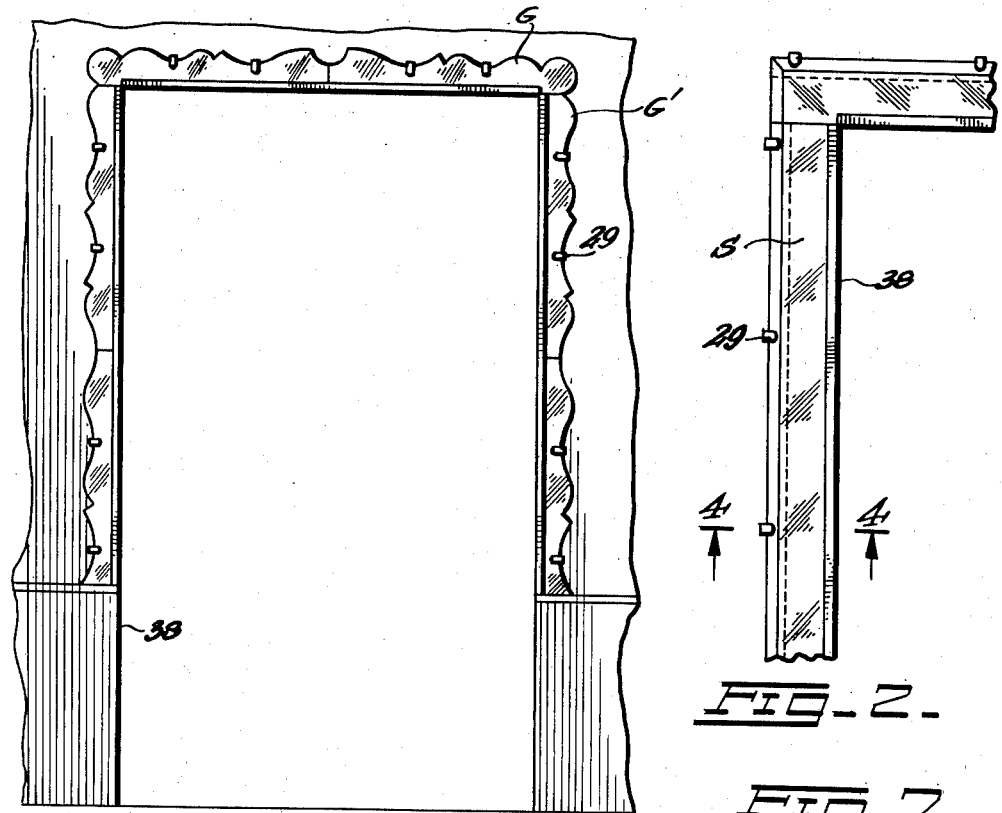
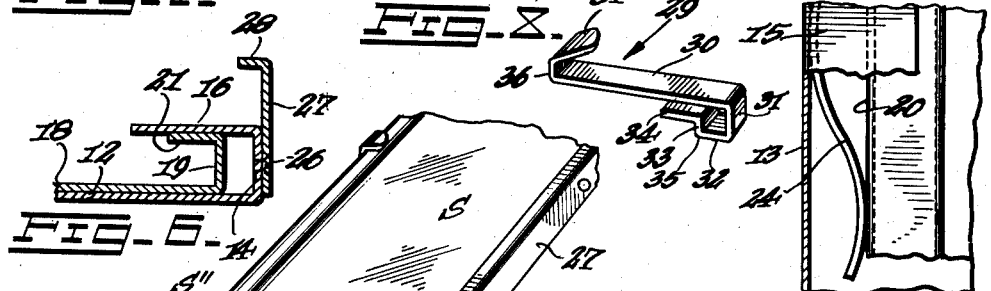
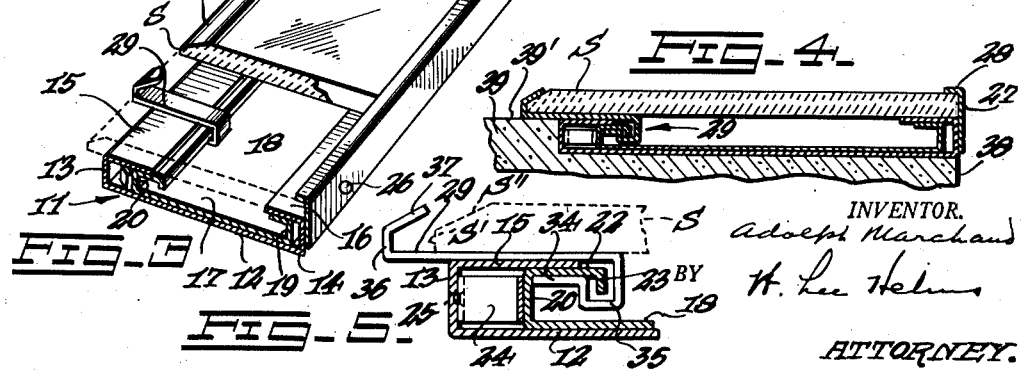
INVENTOR.
Adolph Marchand
BY H. Lee Helms
ATTORNEY.

Patented Dec. 25, 1951

2,579,943

UNITED STATES PATENT OFFICE 2,579,943

STRUCTURAL FRAME UNIT FOR MOUNTING DECORATIVE STRIPS

Adolph Marchand, Jackson Heights, N. Y.

Application September 1, 1950, Serial No. 182,681

5 Claims. (Cl. 20—74)

This invention relates to structural frame units for mounting glass or other decorative strips. In particular, structural frame units in accordance with the present invention are adapted to be imbedded within the surfaces of interior building walls and arranged in end-to-end relationship so as to form decorative door frames, wall moldings, and other ornamental effects.

Each of the structural units of the present invention comprises a longitudinal member adapted to be imbedded in or otherwise secured to a wall throughout its rear portion, the front portion of the longitudinal member being planar so as to abut against the flat rear surface of a glass panel or other decorative strip. The strip is securely held to the longitudinal member by means of an abutment flange extending along one edge of the latter and adapted to grip one edge of the strip and a plurality of clamping elements adapted to grip the opposite edge of the strip and spring biased toward the abutment flange so as to clamp the strip therebetween. The frame units are so constructed that the decorative strips may be quickly and easily removed therefrom for replacement or washing. Furthermore, the structural frame units are adapted to mount decorative strips having marginal configurations of varied types and shapes. This latter advantageous feature is made possible both by the spring biased laterally-slidable mounting arrangement for the clamping elements and also due to the fact that the clamping elements are slidable longitudinally of the structural unit member.

The invention further resides in the various details of construction which provide an economical, effective and durable means for mounting decorative strips. Other objects and advantages of the invention are inherent in the structure as claimed and disclosed and will appear as the description proceeds in more detail.

It is to be understood that the particular embodiment of the invention shown in the drawing and described hereinbelow is intended to be merely illustrative of one of the many forms which the invention may take in practice without departing from the scope of the invention as delineated in the appended claims.

In the drawing:

Fig. 1 is an elevational view showing a plurality of structural frame units utilized as a door frame for mounting decorative glass strips of an intricate marginal configuration around the margin of the door opening;

Fig. 2 is an elevational view similar to Fig. 1 but showing decorative glass strips of a simple design having rectilinear marginal edges;

Fig. 3 is a sectional perspective view of a structural frame unit together with a straight-edged strip, somewhat longitudinally displaced with respect to the frame unit, so as to illustrate the details of construction;

Fig. 4 is a transverse sectional view taken on the line 4—4 of Fig. 2;

Fig. 5 is an enlarged sectional detail view showing a clamping element moved laterally outwardly against the action of the spring so as to be clear of the adjacent edge of the decorative strip, thereby enabling the latter to be disassembled from the frame unit;

Fig. 6 is an enlarged sectional detail view of the longitudinal edge of the structural frame unit opposite the edge having the clamping elements and showing the fixed abutment flange adapted to grip one longitudinal edge of the decorative strip;

Fig. 7 is an enlarged view of a portion of Fig. 2 and is partially broken away to show the spring which biases the clamping elements laterally inwardly; and Fig. 8 is a perspective view of one of the clamping elements.

Each of the structural frame units embodying the present invention comprises a longitudinal channel-shaped member 11 having a planar rear section 12 formed integral with two forwardly extending side walls 13, 14. A first flange section 15 is formed integral with the side wall 13 and a second flange section 16 is similarly formed on the side wall 14. The flange sections 15, 16 extend laterally inwardly toward each other and in parallel spaced relation with respect to the rear planar section 12.

An inner longitudinal channel member 17 extends within the outer channel member 11 and comprises a planar section 18 lying against and slidable with respect to the planar section 12. Along one longitudinal edge of the planar section 18 there is formed a forwardly extending side wall 19 and another forwardly extending side wall 20 is formed integral with and along the opposite longitudinal edge. As best seen in Fig. 6, the forward edge of the side wall 19 is provided with a flange section 21 slidable against the rear surface of the flange section 16 of the outer channel 11. Referring now to Fig. 5, it will be seen that the side wall 20 is also provided with a laterally extending flange section 22 slidable against the rear surface of the flange section 15 of the outer channel member 11. The inner edge of the flange section 22 is provided with a rearwardly extending portion 23 for a purpose to be described below.

It will be noted that the inner longitudinal channel member 17 is of a smaller width than the outer channel member 11, whereby the inner channel member 17 is slidable within and laterally of the outer channel member 11. As best seen in Figs. 5 and 7, a sinuous leaf spring 24 extends throughout the space between the side wall 13 of the outer longitudinal channel member 11 and the side wall 20 of the inner channel member 17 and is secured to the side wall 13 by any suitable securing means as at 25. Spring 24 presses against the side walls 13, 20 so as to bias the inner channel member 17 laterally within the outer channel member 11 toward the side wall 14 of the latter. The side wall 14 has secured thereto by means of screws 26 an abutment flange 27 extending forwardly of the flange section 16 and then inwardly as at 28 in parallel spaced relation with respect thereto.

Referring now to Fig. 8, each of the clamping elements, designated generally by the reference numeral 29, comprises a flat body portion 30 adapted to lie against the forward surface of the flange section 15. The inner end of the body portion 30 is turned rearwardly as at 31, then laterally outwardly as at 32, then forwardly as at 33, and then laterally outwardly as at 34. Referring to Fig. 5, it will be seen that the portions 31, 32 and 33 form a U-shaped channel member adapted to receive the rearwardly extending portion 23 of the flange section 22. The laterally extending portion 34 of the clamping element 29 abuts against and is slidable with respect to the rear surface of the flange section 22. It will thus be seen that the clamping elements 29 are slidable for adjustment longitudinally of the channel members 11, 17. The outer end of the body portion 30 of each of the clamping elements 29 is provided with a forwardly extending portion 36 adapted to abut against the edge S' of a decorative glass strip S. The forward edge of the portion 36 has integral therewith an angularly extending portion 37 adapted to abut against the bevelled face S" adjacent the edge S' of the strip S.

The manner of mounting and dismounting the decorative strip S with respect to the structural frame unit will now be described. When the strip is to be assembled, the rearwardly extending portion 23 of the inner longitudinal member 17 is pressed laterally outwardly so as to slide the inner member 17 and hence also the clamping elements 29 laterally in a direction away from the abutment flange 27. The edge S' and bevelled surface S" of the decorative strip S is then placed in engagement with the portions 36, 37 of the clamping elements 29 and the strip S is then pivoted rearwardly so as to lie flat against the forward surfaces of the flange sections 15, 16 of the outer member 11. Upon releasing the strip S, the leaf spring 24 will react against the side walls 13, 20 so as to move the inner longitudinal member 17 and hence also the clamping elements 29 laterally inwardly toward the abutment flange 27, thereby also sliding the adjacent edge of the strip S beneath the inturned portion 28 of the flange 27, as best seen in Fig. 4. The decorative glass strip S will then be securely clamped in position by the clamping elements 29 and the abutment flange 27.

When the mounted strip S is to be removed, it is merely slid laterally against the action of the spring 24 so as to clear the inturned portion of the flange 27 and may then be moved forwardly free of the unit.

In Fig. 1 there is shown a modified form of glass strip G having an intricate marginal edge G', rather than the rectilinear edge S' formed on strip S. It will be obvious that since the clamping elements are both slidably adjustable longitudinally of the structure frame units and also slidably laterally thereof, the positions of the clamping elements 29 may easily be adjusted so that the latter may securely clamp the decorative strips G notwithstanding the irregular shape of their marginal edges G'.

Fig. 4 shows the manner in which the structural units may be imbedded in a wall surface. The reference numeral 38 indicates a door opening, the latter being more clearly shown in Fig. 1. The outer longitudinal channel member 11 is embedded within the wall 39 so that the forward surface of the flange section 15 lies flush with the surface 39' of the wall 39. Similarly the side wall 14 and abutment flange 27 may lie approximately flush with the surface of the door opening 28, thereby providing a neat, aesthetically pleasing and functional door frame on which decorative strips may be mounted.

Having described my invention, what I claim and desire to secure by Letters Patent, is as follows:

1. A structural frame unit for mounting a decorative strip and comprising a first longitudinal member including a planar section having along one longitudinal edge a first flange section extending parallel to said planar section and spaced therefrom and along the opposite longitudinal edge a second flange section extending parallel to said planar section and in a common plane with said first flange section whereby the rear surface of a decorative strip may be slidably mounted on said flange sections, a second longitudinal member having a planar section and a flange element spaced from and parallel thereto, said second member being slidable against the interior surface of said first named planar section and said flange element being slidable against the interior surface of one of said flange sections whereby the second member is mounted within the first-recited longitudinal member for free sliding movement laterally thereof, abutment means secured to and adjacent one longitudinal edge of said first-recited member and adapted to abut against one edge of a decorative strip, a plurality of clamping elements adapted to grip the opposite edge of said decorative strip and attached to said second member, and yieldable spring means biasing said second member laterally toward said abutment means.

2. The combination set forth in claim 1 and having a longitudinal decorative glass strip lying against the flange sections of said first-recited longitudinal member, said abutment means abutting one longitudinal edge of the strip and said clamping elements engaging the opposite longitudinal edge of the strip so as to hold the latter in position on said flange sections.

3. A structural frame unit for mounting a decorative strip and comprising a longitudinal member including a planar section having along one longitudinal edge a first flange section extending parallel to said planar section and spaced therefrom and along the opposite longitudinal edge a second flange section extending parallel to said planar section and in a common plane with said first flange section whereby the rear surface of a decorative strip may be slidably mounted on said flange sections, a second longitudinal member within said first longitudinal member and having a second planar section slidably bearing against the interior surface of said first-recited planar section and a pair of oppositely-disposed flange sections slidably bearing against the interior surfaces of said flange sections of the first-recited longitudinal member, said second member having a narrower width than said first-recited member and slidable laterally with respect thereto, said members each having side walls along the longitudinal edges of the planar section and secured to the latter and to the respective flange sections, compression spring means between a first side wall of said first-recited longitudinal member and the side wall adjacent thereto of said second longitudinal member for biasing said second member laterally toward the opposite side wall of said first-recited longitudinal member, an abutment flange secured to said opposite side wall, and a plurality of clamping elements attached to said second member and slidably mounted on the flange section of said first-recited member adjacent said first side wall.

4. A structural frame unit for mounting a decorative strip and comprising an outer channel-shaped longitudinal member, an inner longitudinal member within and slidable laterally of said outer member, an abutment flange secured along one edge of said outer member and having an inturned portion parallel to and spaced from said outer member whereby one edge of a decorative strip may be held between said outer member and said inturned portion, a decorative strip edge clamping means attached to said inner member and slidable therewith laterally toward and away from said abutment flange and located at the opposite edge of said outer member, and spring means biasing said inner member and said clamping means toward said abutment flange.

5. The combination set forth in claim 4 and having a decorative glass strip lying against said outer member and held securely in place along its edges by said clamping means and said abutment flange.

ADOLPH MARCHAND.

REFERENCES CITED

The following references are of record in the file of this patent:

UNITED STATES PATENTS

| Number | Name | Date |
| --- | --- | --- |
| 2,184,893 | Lumley | Dec. 26, 1939 |